March 25, 1969
J. E. STRAUB
3,435,391
ELECTROMAGNETIC LINEAR-TO-ROTARY MOTION STEPPING MECHANISM
Filed Sept. 28, 1966
Sheet 1 of 2
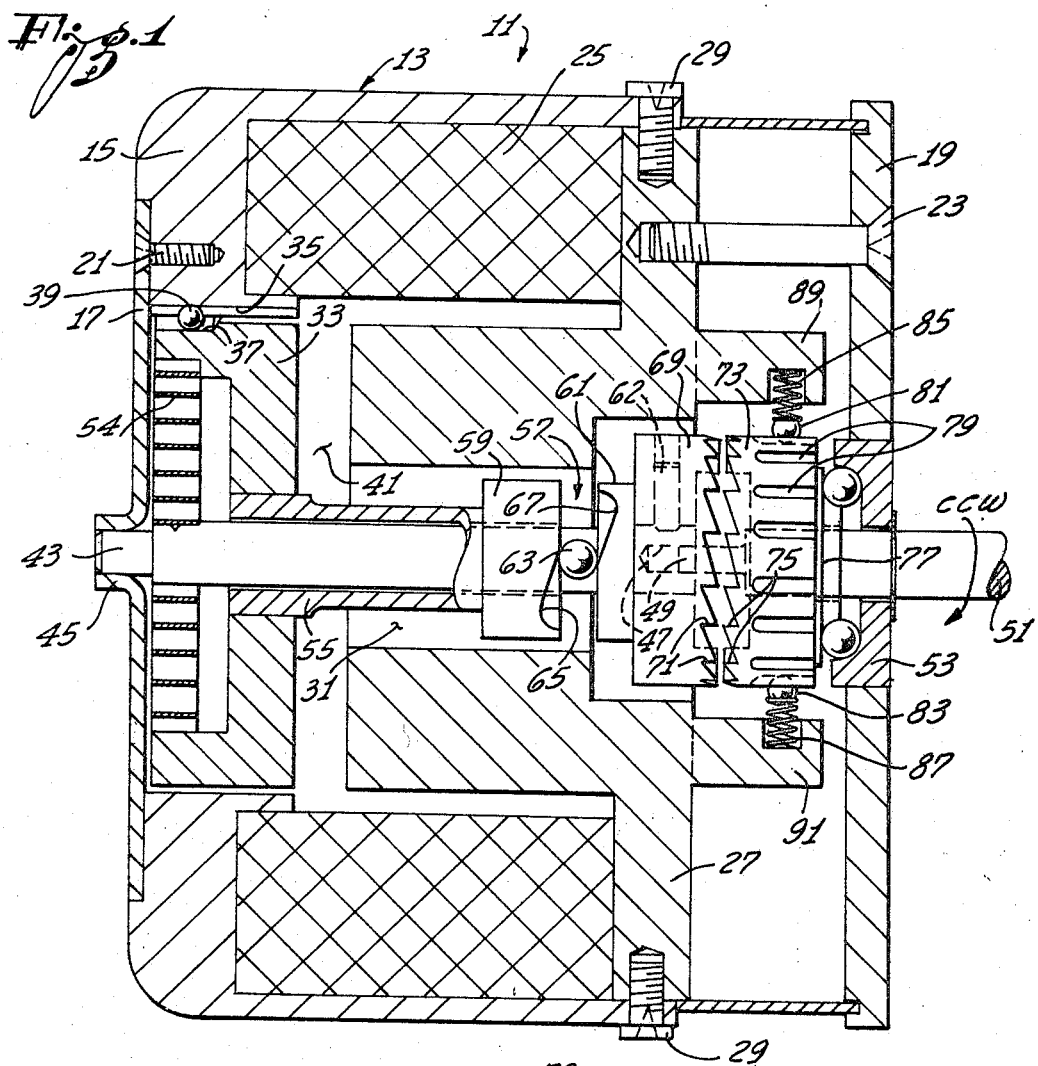
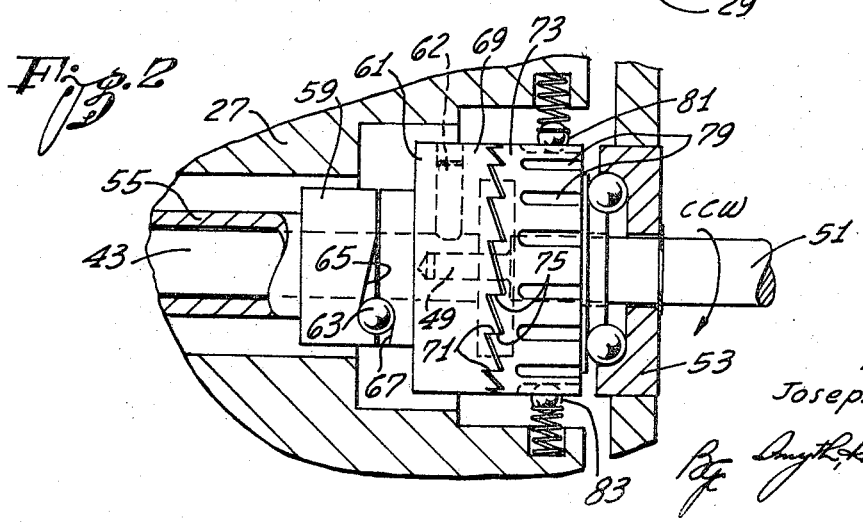
INVENTOR:
Joseph E. Straub
ATTORNEYS March 25, 1969   J. E. STRAUB   3,435,391
ELECTROMAGNETIC LINEAR-TO-ROTARY MOTION STEPPING MECHANISM
Filed Sept. 28, 1966   Sheet 2 of 2

INVENTOR:
Joseph E. Straub

ATTORNEYS

United States Patent Office 3,435,391
Patented Mar. 25, 1969

3,435,391
ELECTROMAGNETIC LINEAR-TO-ROTARY MOTION STEPPING MECHANISM
Joseph E. Straub, Manhattan Beach, Calif., assignor to Solenoid Devices, Inc., Redondo Beach, Calif., a corporation of California
Filed Sept. 28, 1966, Ser. No. 582,685
Int. Cl. H01f 7/08, 7/18; H02k 7/06
U.S. Cl. 335—228                 14 Claims This invention relates to a stepping mechanism or stepping motor.

A stepping mechanism, as the term implies is a power source having an output shaft which is driven intermittently. The motion of the output shaft may be either oscillatory motion or intermittent rotary motion in the same direction. The typical stepping mechanism includes a solenoid which is intermittently energized to produce the desired intermittent movement of the output shaft in response to each pulse of energizing current.

The output shaft of the stepping mechanism may be connected to drive various types of external loads or members such as switches, printing wheels, cams, etc. Regardless of the type of external member which is driven by the stepping mechanism, it is important that the rotation of the external member be halted precisely at the preselected point. For this reason it is important that the stepping mechanism impart a preselected increment of movement to the external member and very accurately halt the movement of the external member after each increment of movement thereof. For example when a rotary switch is being driven by a stepping mechanism, if the switch arm thereof is not stopping at the appropriate locations, the proper circuits may not be energized at the proper time or at all thereby resulting in a malfunction of the device.

Difficulty has been experienced with may prior art stepping mechanisms in stopping the external member at the predetermined locations. The tendency has been for the inertia of the moving external member to overthrow or force the stepping mechanism to move past the preselected stopping point in which event a malfunction of the controlled device is very likely to occur. Some prior art devices have been deficient in that they have not provided a sufficient braking force to overcome the inertia of the moving external member. Mechanical devices which produce additional braking force are generally undesirable because they are quite complex and relatively expensive. On the other hand detent devices with heavy springs are relatively simple but the heavy loaded detent resists all movement of the output shaft thereby necessitating the use of an oversized solenoid to drive the output shaft.

Of course, this problem is magnified when the stepping mechanism is required to drive a relatively heavy external member. Moreover, the stepping mechanisms are frequently required to start, rotate and stop the external member within very short time periods such as 15 milliseconds in which event the braking force required is correspondingly increased.

Stepping mechanisms frequently utilize a rotary solenoid of the type which converts one stroke of axial movement of an armature into one increment of rotation of the output shaft. A cam and ball converter is often used to convert the axial movement of the armature into an increment of rotational movement of the output shaft. At the end of the armature stroke, the coil is de-energized and the armature is returned to its normal or de-energized position. The ball converter must then be recocked so that it will be operable upon a second stroke of axial movement of the armature to produce a second increment of rotation of the output shaft.

The ball converter often includes driving and driven cams with a ball there between. In recocking the ball converter, it is common practice to counterrotate the driving cam to reestablish the initial relative positions of the cams and ball so that upon the second stroke of the armature a second increment of rotation of the output shaft will be produced. In those instances where it is desired to rotate the output shaft intermittently in the same direction, it is necessary to disconnect the portion of the ball converter which is being counterrotated for recocking purposes from the output shaft so that the output shaft will not also be counterrotated and therefore caused to oscillate. It has been common practice in the prior art to utilize a pair of engageable ratchets in the drive train between the armature and the output shaft to accomplish this and other purposes.

One problem that has occurred in the use of engageable and disengageable ratchets is that the teeth on the respective ratches may "hang up" and not properly mesh. This causes the movement of the output shaft to vary from the desired output and a failure of the controlled device may result. One reason for this type of failure in these prior art devices is that the driving ratchet begins to rotate prior to the time that the ratchet teeth engage. This spiraling of the driving ratchet into engagement with the driven ratchet makes misalignment of the teeth more likely and makes automatic correction of the misalignment less likely.

The stepping mechanism of the present invention positively prevents overthrow of the external member and thereby substantially increases the reliability of the stepping mechanism. The present invention also substantially prevents misalignment of the ratchet teeth and facilitates correction of any misalignment that may occur. Moreover, these advantages are accomplished with a relatively simple and easily assembled structure.

The antioverthrow feature of this invention may be accomplished by utilizing driving and driven ratches in the drive train between the armature of the solenoid and the output shaft. At the end of the stroke of the solenoid, the driven ratchet is held against axial movement by a suitable abutment or thrust bearing while the driven ratchet is urged into driving engagement with the driven ratchet by the driving force of the solenoid which may be of the order of 75 lbs. Thus, the output shaft cannot overthrow or rotate past the preselected stopping point without either moving the driving ratchet therewith or becoming axially separated from the driving ratchet. However, the driving ratchet is held against further rotation in the same direction by the ball converter and the armature of the solenoid and thus will not permit additional rotation of the output shaft in the same direction. Accordingly, there can be no overthrow of the external member without axial separation of the ratches which are held together by the force produced by the solenoid. It has been found that this force is sufficient to hold the ratches together even for heavy duty application.

To reduce misalignment of the ratchet teeth on the two ratchets and prevent the ratchet teeth from failing to properly mesh, the driving ratchet is restrained against any rotational movement during axial movement thereof toward the driven ratchet until the teeth thereof engage the teeth of the driven ratchet. This is accomplished by rendering the converter, which is operative to convert the linear solenoid motion into a rotary output, responsive to the engagement of the ratchet teeth. It has been found that if the teeth of the ratchet become misaligned that they will assume the proper driving relationship without adversely affecting the amount of incremental rotation of the output shaft.

One illustrative embodiment of the invention which has been found particularly advantageous in driving heavy loads may include a solenoid having a driving member or output member and intermittently energizable to axially advance the output member. The solenoid also includes a suitable converter for converting the axial movement of the output member into an increment of rotation of an output shaft. However, according to the present invention, the converter is not operative until the output member is firmly held against axial movement thereof.

A driving ratchet is connected to the output member. A driven ratchet, which is engageable with the driving ratchet is secured to the output shaft rotation therewith. An abutment is provided to prevent the driven ratchet from advancing axially.

The driving ratchet, the output member, and the ball converter are movable axially upon energization of the solenoid until the driving ratchet engages the driven ratchet and further axial movement thereof is halted thereof by the abutment means. The converter is responsive to the failure of the driving ratchet to advance further in the axial direction to convert additional axial movement of the armature of the solenoid into rotational movement of the ratchets and the output shaft.

The invention also includes a second illustrative embodiment which is more compact than the above described embodiment and is particularly suited for driving lighter external loads. This second specific embodiment of the invention is made more compact in that the converter is recocked in a novel manner.

According to this embodiment of the invention, the converter may include a conventional driven cam secured to the output shaft, a driving cam and a ball which are operative to convert linear movement of the armature of the solenoid into rotational movement of the output shaft. The driving cam is held against rotation during the operation of the converter to allow the cam surface and the ball to rotate the output shaft. At the end of the increment of rotation, the relative positions of the cam surfaces and the ball are such that additional axial movement of the armature in the same direction is not possible. It is therefore necessary to recock or reestablish the initial relative positions of the cam surfaces and the ball so that upon a subsequent energization of the solenoid, a second increment of rotation of the output shaft will result. Heretofore this function has been accomplished by counterrotating the driven cam; however, according to this embodiment of the invention the initial relative position of these elements of the invention is establshed by rotating the driving cam in the same direction as the direction of rotation of the driven cam and the output shaft. Thus, the converter is recocked by causing the driving cam to follow the incremental rotation of the driven cam.

This desirable function may be accomplished for example by utilizing each increment of rotation of the output shaft to wind a torsion spring which is operative to impart the desired increment of rotation to the driving cam. Another feature of this invention is the retaining of the driving cam against rotation by ratchet teeth thereon which engage ratchet teeth on the armature when the solenoid is energized. These ratchet teeth are disengageable upon de-energization of the solenoid to allow the driving cam to be rotated by the torsion spring.

The invention, both as to its organization and method or operation together with further features and advantages thereof may best be understood by reference to the following description taken in connection with the accompanying drawing in which:

FIG. 1 is the sectional view through a central portion of one form of stepping mechanism with the solenoid thereof being illustrated in the de-energized condition;

FIG. 2 is a fragmentary sectional view illustrating the relative positions of the components of the device with the solenoid energized and with one increment of rotation completed;

Figure 3:
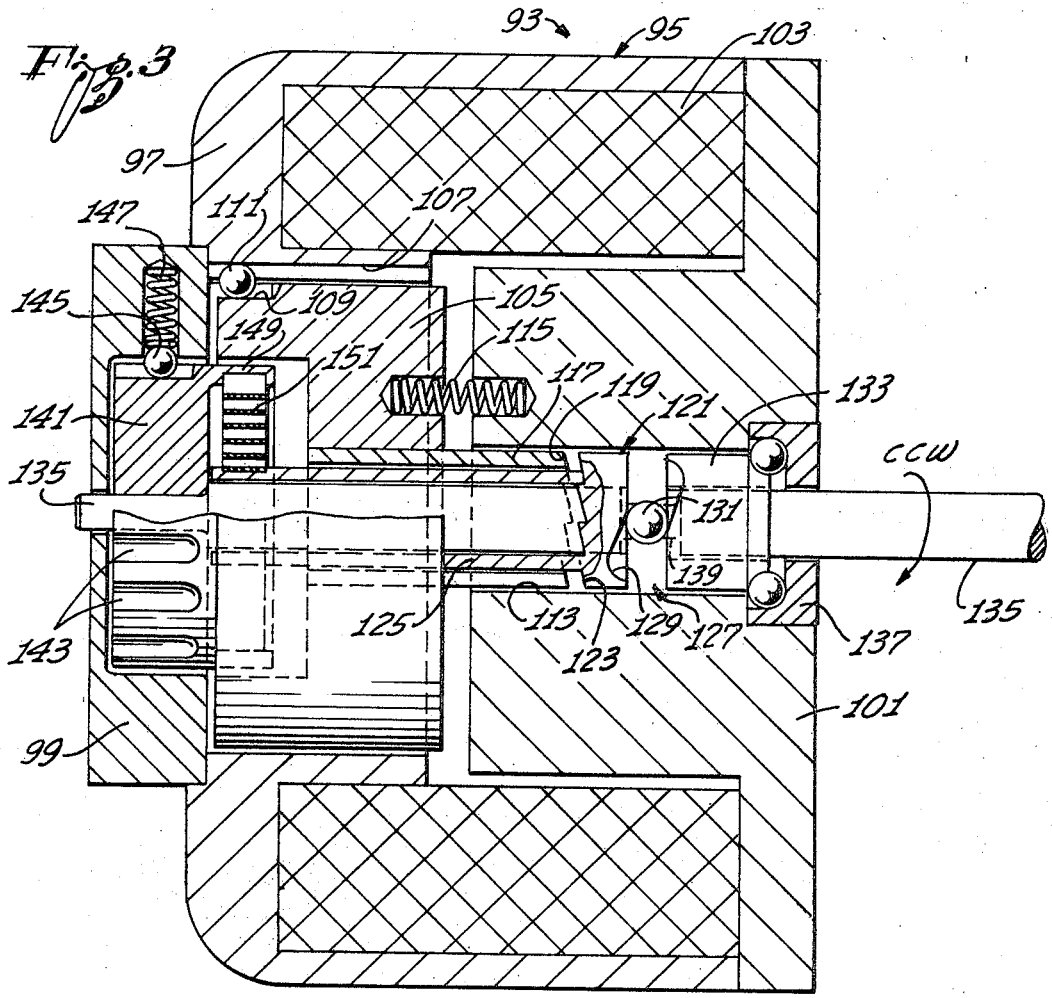
FIG. 3 is a sectional view similar to FIG. 1 showing a second embodiment of the present invention.

Referring to the drawings and in particular to FIG. 1 thereof, reference numeral 11 designates one form of stepping mechanism constructed in accordance with the teachings of this invention. The stepping mechanism 11 is particularly adapted for use with relatively heavy loads.

The stepping mechanism 11 includes a shell or housing 13 having a stator ring 15 at one end thereof. The shell 13 has end plates 17 and 19 at opposite ends thereof which are held in place by screws 21 and 23, respectively.

A suitable wound coil 25 is retained within the shell 13 adjacent the stator ring 15. Appropriate leads (not shown) are provided to the coil 25. A ferromagnetic core 27 extends a substantial distance into the coil 25 and is suitably secured to the shell 13 by screws 29. The core 27 has an axial passageway 31 extending completely therethrough.

An armature 33 is mounted for axial movement within the shell 13. Rotational movement of the armature 33 relative to the stator ring 15 is prevented by cooperating grooves 35 and 37 in the stator ring and armature, respectively and a ball 39 mounted in these grooves. In the de-energized position shown in FIG. 1, the armature 33 is spaced from the core 27 by a gap 41. When the coil 25 is energized, the armature 33 is drawn toward the core 27 to substantially reduce or eliminate the gap 41. Thus, the portion of the device described hereinabove functions as a solenoid or the driving mechanism of the stepping motor 11.

A shaft 43 is supported for rotation and a limited amount of axial movement by a suitable bearing 45 in the end plate 17 and extends axially into the shell 13. The inner end of the shaft 43 has a recess 47 therein which receives a reduced diameter extension 49 of an output shaft 51. The output shaft 51 is axially aligned with the shaft 43 and is mounted for rotation by a bearing 53 in the end plate 19. The bearing 53 holds the shaft 51 against axial movement. The recess 47 and the extension 49 permits relative rotation between the shafts 43 and 51 and a limited amount of relative axial movement therebetween. A scroll spring 54 is fixed at its inner end to the shaft 43.

The armature 33 has a tubular extension or a tubular driving member 55 rigidly affixed thereto and extending axially thereof toward the output shaft 51. The driving member 55 loosely surrounds the shaft 43 as shown in FIG. 1 and moves along an axial path with the armature 33 upon energization of the coil 25.

A converter 57 is provided for converting the axial movement of the driving member 55 into rotational movement of the shaft 43. The converter 57 includes a driving cam 59 which may be integral with the driving member 55 or a separate member rigidly affixed thereto, a driven cam 61 secured to the shaft 43 by a set screw 62 for movement therewith, and a ball 63 between the two cams. The cams 59 and 61 have cam surfaces or grooves 65 and 67 respectively which are engageable with the ball 63.

A driving ratchet 69 having several teeth 71 is fixed to the cam 61 for movement therewith. A driven ratchet 73 having teeth 75 is affixed to the output shaft 51. Self locking teeth 73 and 75 as illustrated are preferred but any interengageable surfaces that form a good driving connection may be used. The teeth 71 and 75 are spaced from each other in the de-energized condition shown in FIG. 1, but come into driving engagement upon energization of the coil 25. If it is desired to maintain the space between the ratchets 69 and 73 in FIG. 1 each time the coil 25 is de-energized, a suitable spring may be employed to urge the ratchets apart.

The ratchet 73 has an outer face 77 engaging the bearing 53 which acts as an abutment or a thrust bearing to prevent axial movement of the ratchet 73 to the right as viewed in FIG. 1. As shown in FIG. 1, the ratchet 73 preferably has a plurality of evenly spaced axially extending notches 79 on the periphery thereof to allow the ratchet 73 to act as a detent wheel. A pair of detent members 81 and 83 are urged into engagement with oppositely disposed notches 79 by detent springs 85 and 87, respectively. The detent springs 85 and 87 act against fixed lugs 89 and 91, respectively, or any other suitable fixed members.

The operation of the device is as follows. With the coils 25 de-energized and the components of the stepping mechanism 11 in the position shown in FIG. 1, current is supplied to the coil to energize the latter. This causes the armature 33 to move to the right toward the core 27. The driving member 55 which is rigidly affixed to the armature 33 and slidably fits over the shaft 43 will move axially to the right with the armature. Thus, the cam 59 and the ball 63 are also urged to the right. As the armature 33 is fixed against rotation by the grooves 35 and 37 and the ball 39, the movement of the armature and the cam 59 will be axial and not rotational. Accordingly the ball 63 applies an axial force to the driven cam 61 and the driving ratchet 69. As the shaft 63 to which the ratchet is affixed can move axially a limited amount as permitted by the recess 47 and the extension 49, the ratchet 69 and the cam 61 will also move to the right under the urging of the armature 33.

Movement as a unit of the driving member 55, the converter 57, and the ratchet 69 to the right continues until the teeth 71 engage the teeth 75 of the driven ratchet 73. At this point axial movement of the driving ratchet 69 is halted because the driven ratchet 73 is prevented from moving to the right by the bearing 53. However, movement of the armature 33 continues and forces the nonrotatable driving cam 59 axially toward the rotatable driven cam 61. Such relative axial movement between the cams 59 and 61 causes the ball 63 to roll from the shallow end of the recess 67 to the deep end of this recess as shown in FIG. 2. As the cam 59 cannot rotate this action of the ball 62 imparts one increment of rotation to the cam 61 in the direction of the arrows in FIGS. 1 and 2. This causes the driving ratchet 69 to impart a similar increment of rotation to the ratchet 73 and to the output shaft 51. Thus the converter 57 is responsive to engagement of the ratchets 69 and 73 and and continued movement of the driving member 55 to produce the increment of rotation. Specifically the converter 57 is caused to operate when the ball 63 can no longer axially displace the driven cam 61. The notches 79 are appropriately spaced circumferentially along the ratchet 73 so that the balls 81 and 83 will snap into the adjacent notches at the completion of the increment of rotation as shown in FIG. 2.

At the completion of the stroke of the armature 33, the armature will be in an engagement with the core 27 or with a spacer (not shown) affixed thereto. This is the position shown in FIG. 2. The structure shown in FIGS. 1 and 2 hereof has an antioverthrow feature which prevents the inertia of a heavy load from continuing to rotate beyond the preselected stopping point therefore. As the ratchet 73 is affixed to the output shaft 51, the output shaft cannot continue is counterclockwise rotation in the direction of the arrows in FIGS. 1 and 2 with out disengaging the ratchets 69 and 73 or by rotating the ratchets together as an unit. With the ball 63 and the cam surfaces 65 and 67 in the position shown in FIG. 2, it is apparent that continued rotation of the ratchet 69 in the direction of the arrow is positively prevented by the ball 39 and he grooves 35 and 37. Thus, overthrow of the driven member is only possible if the ratchets 69 and 73 move axially relative to each other to allow the teeth thereof to clear one another. The teeth 71 and 75 however are held in driving engagement by the abutment or bearing 53 and by the driving force of the energized coil 25. The driving force of the solenoid is quite substantial and will not be overcome by the usual loads that are driven by stepping mechanisms. Accordingly, the movement of the member which is driven by the output shaft 51 is rapidly and accurately braked to a halt at the preselected location without the addition of complex mechanical braking mechanisms. The force of the energized coil remains active sufficiently long to cause this braking action. The detent member 81 and 83 act to releasably retain the shaft 51 at the preselected location after the inertia forces of the load have been absorbed by the anti-overthrow portions of the device.

During the rotation of the cam 61 and the shaft 43, the scroll spring 54 is wound tighter or tensioned. Thus, when the coil 25 is de-energized and with the components of the device as shown in FIG. 2 the scroll spring 54 exerts a force on the shaft 43 and the cam 61 tending to counterrotate these members. With the coil 25 de-energized, this force is sufficient to counterrotate the driven cam 61 from the position of FIG. 2 back to the position shown in FIG. 1 to recock the converter 57 so that when the coil 25 is again energized, a second increment of rotation will be imparted to the output shaft 51. The recocking movement of the cam 61 is arrested by the converter 57 in a conventional manner. With the coil 25 de-energized, the ratchet 69 may counterrotate with the cam 61 as it is no longer axially held into right engagement with the ratchet 73. If a return spring (not shown) is provided the ratchets 69 and 73 will separate as shown in FIG. 1. If however no return spring is provided the teeth 71 and 75 of the ratchets may remain in substantial engagement with each other. It is apparent that when the coil 25 is again energized the cycle described above will be repeated.

As overthrow of the driven member is positively prevented and as the driving ratchet 69 advances axially toward the driven ratchet 73 without rotating, any misalignment of the teeth 71 and 75 would be unusual. However, should such misalignment occur and the resulting engagement of the teeth provide a sufficient resisting force to the axial travel of the cam 61, the converter 57 would be operative to rotate the ratchet 69 into the proper driving relationship.

Figure 4:
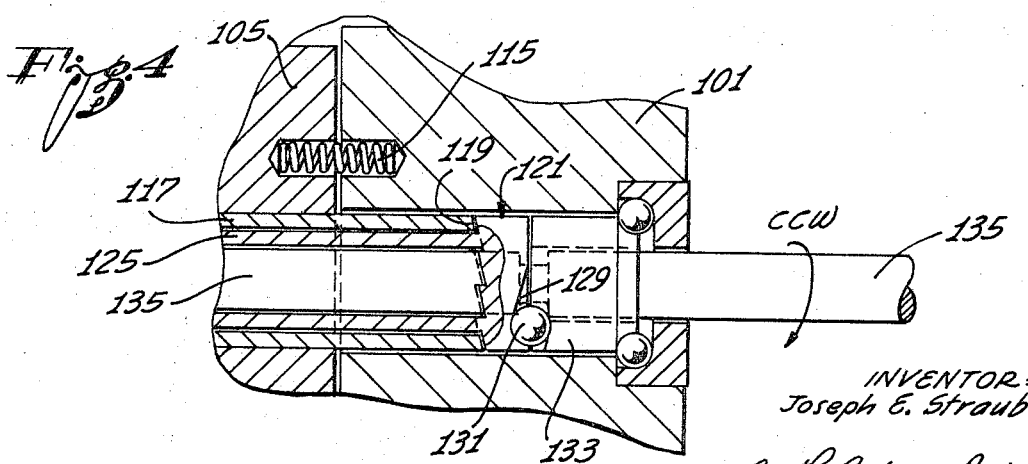
FIG. 4 is a fragmentary sectional view similar to FIG. 2 showing the components of the second embodiment of the invention with the solenoid energized and with one increment of rotation of the output shaft completed.

FIGS. 3 and 4 show a second illustrative embodiment of the present invention which is of a lighter weight and more compact than the first illustrative embodiment and is particularly adapted for use with lighter loads. The principal differences between the two embodiments are the relocation of the converter and ratchets and the novel manner in which the converter is recocked.

The stepping mechanism 93 of FIGS. 3 and 4 includes a shell 95 having a stator ring 97 at one end thereof. One end of the shell 95 is closed by a cover 99 and the other end of the shell is closed by a core 101. A coil 103 is suitably fixed within the shell 95 adjacent the stator ring 97. An armature 105 is mounted for axial movement within the shell 95 but is restrained against rotational movement by a pair of grooves 107 and 109 in the armature and the stator ring, respectively and a ball 111. The core 101 has an axial passageway 113 extending therethrough and the armature 105 is pulled toward the core 101 as shown in FIG. 4 when the coil 103 is energized. A return spring 115 acts between the core 101 and the armature 105 to return the armature to the position shown in FIG. 3 upon de-energization of the coil 103.

A tubular driving member 117 is rigidly affixed to the armature 105 for axial movement therewith and extends a limited axial distance into the passageway 113. The annular outer end of the driving member 117 has a plurality of ratchet teeth formed therein to define a driving ratchet 119.

A tubular driven ratchet 121 having a plurality of ratchet teeth 123 engageable with the ratchet 119 is slidably mounted in the passageway 113. In the de-energized position shown in FIG. 3, the ratchet 119 is axially spaced from and does not drivingly engage the ratchet teeth 123. The driven ratchet 121 has a hollow stem portion 125 extending internally of the tubular driving member 117 and freely moveable with respect thereto.

A converter 127 which is identical to the converter 57 is provided. The converter 127 includes a driving cam 129 formed on the opposite end of the driven ratchet 121, a ball 131, and a driven cam 133. The converter 127 operates in the name manner as the converter 57. The driven cam 133 is affixed to an output shaft 135 which extends axially completely through the shell 95. The output shaft 135 is mounted for rotation at one end by a thrust bearing 137 and extends internally of the tubular stem portion 125 to the opposite end of the shell 95 where other suitable bearing means may be provided. The output shaft 135 is preferably fixed against axial movement and has a reduced diameter central portion 139 to provide sufficient space for the converter 127.

The tubular stem portion 125 of the driving ratchet 119 extends completely through the tubular driving member 117 and terminates adjacent the left end of the shell 95. The shaft 135 extends beyond the end of the stem portion 125 and has a detent wheel 141 affixed thereto. The detent wheel 141 has a plurality of evenly spaced axially extending notches 143 on the periphery thereof for engagement with a detent ball 145 which is biased into the adjacent notch by a spring 147. The detent wheel 141 has an inwardly extending arm 149 to which an outer end of a scroll spring 151 is secured. The inner end of the scroll spring 151 is rigidly affixed to the stem portion 125.

With the coil 103 de-energized, the components of the stepping mechanism 93 will be in the position shown in FIG. 3. When current is supplied to the coil 103, the armature 105 is pulled toward the core 101 against the biasing action of the spring 115. The armature 105 and the driving member 117 move to the right along an axial path without rotating. After a predetermined amount of axial movement, the driving ratchet 119 will engage the teeth 123 of the driven ratchet 121. The driven ratchet 121 is now also locked against rotation by virtue of the inter-engagement of the ratchets 119 and 121. The driving ratchet 119 drives the driven ratchet 121 and the driving cam 129 to the right. This causes the converter 127 to move to the position shown in FIG. 4 to convert the axial movement of the cam 129 into an increment of rotational movement of the driven cam 133. As the driven cam 133 is affixed to the output shaft 135, the result is a predetermined amount of rotation of the output shaft 135 in the direction of the arrows in FIGS. 3 and 4. As in the first embodiment the converter 127 cannot operate until ratchets 119 and 121 engage.

This increment of rotation of the output shaft 135 forces the detent ball 145 out of one of the notches 143 and allows the detent ball to engage the adjacent notch at the termination of the rotation of the output shaft. Such rotation of the detent wheel 141 causes tightening or tensioning of the scroll spring 151 which is affixed to the detent wheel 141 by the arm 149. The scroll spring 151 which is affixed at its inner end to the stem portion 125 therefore tends to rotate the driving cam 129 through a similar increment of rotation in the direction of the arrows in FIGS. 3 and 4. However, so long as the coil 103 is energized, such rotation of the driving cam 129 is prevented by the ratchet 119 which is fixed against rotation and which is in engagement with the teeth 123 of the driven ratchet 121.

When the coil 103 is de-energized the return spring 115 is operative to force the armature 105 and the driving ratchet 119 to the left to thereby separate the ratchets 119 and 121. The scroll spring 151 is now operative to rotate the cam 129 through an increment of rotation in the direction of the arrows in FIGS. 3 and 4 to recock the converter 127. As in the first embodiment the converter itself is operative to halt the recocking movement in a conventional manner. Thus, in the embodiment of FIGS. 3 and 4, the driving cam 129 follows the movement of the output shaft 135 to recock the converter 127.

It is apparent that the device of FIGS. 3 and 4 prevents overthrow in a manner similar to that indicated in connection with FIGS. 1 and 2. Thus, the force exerted by the armature 105 acts to maintain the ratchets 119 and 121 in interlocking relationship and to maintain the cams 129 and 133 and the ball 131 in the position shown in FIG. 4 to prevent rotation of the output shaft 135 beyond the position shown in FIG. 4.

In this embodiment the ratchets 119 and 121 engage to lock the driven ratchet against rotation and to drive the converter 127. Thus, the driven ratchet 121 is drivingly connected to the output shaft 135 by the converter 127. The ratchets are disengageable to allow recocking of the converter 127 by rotation of the driving cam 129. As the ratchet 119 advances axially toward the ratchet 121 without rotating, misalignment and "hang up" of the teeth thereof are precluded in the same manner described above in connection with the first embodiment.

Although exemplary embodiments of the invention have been shown and described, many changes, modifications, and substitutions may be made by one having ordinary skill in the art without necessarily departing from the spirited scope of this invention.

I claim:
1. In a stepping mechanism, the combination of:
a movable member;
coil means for moving said movable member along a path;
an output shaft; and
drive means for drivingly interconnecting said movable member and said output shaft, said drive means including converter means for driving said output shaft in rotation in response to movement of said movable member along the path, driving and driven ratchets engageable with each other to allow said movable member to drive said output shaft and disengageable to prevent said movable member from driving said output shaft, and means for substantially preventing operation of said converter means when said ratchets are disengaged.

2. A combination as defined in claim 1 wherein said driven ratchet is drivingly connected to said output shaft ad said driving ratchet is drivable in rotation by said converter means.

3. A combination as defined in claim 1 wherein both of said ratchets are movable along said path with said movable member and means are provided for substantially preventing rotation of said ratchets when said converter means is rotating said output shaft.

4. In a stepping mechanism for intermittently moving an object, the combination of:
a rotatable output shaft connectible to the object;
means for mounting said output shaft for rotation;
a first ratchet drivingly connectible to said output shaft;
a second ratchet translatable in one direction toward said first ratchet;
a driving member drivingly connected to said second ratchet;
electrical means for translating said driving member in said one direction to cause said second ratchet to translate in said one direction into engagement with said first ratchet; and
converter means responsive to the engagement of said ratchets and the continued movement of said driving member in said one direction for converting the translational movement of said driving member into an increment of rotational movement of said output shaft.

5. A combination as defined in claim 4 including means for preventing said second ratchet from rotating more than said increment of rotational movement and abutment means for preventing any substantial movement of said driven ratchet in said one direction whereby said ratchets are firmly held together by said electrical means and said abutment means to prevent overthrow of the object and said output shaft.

6. A combination as defined in claim 4 wherein said converter means includes a driving cam and a driven cam, said driven cam being mounted on said output shaft, said driving cam having said first ratchet thereon and said driven member having said second ratchet thereon, and means for substantially preventing rotation of said second ratchet whereby said ratchets are firmly held together by said electrical means and said abutments means to prevent overthrow of the object and said output shaft.

7. In a stepping mechanism including a solenoid which is intermittently energizable to intermittently axially advance an output member, the combination of:
   a rotatable driving ratchet movable generally axially;
   a rotatable driven ratchet drivingly engageable with the driving ratchet;
   an output shaft drivingly connected to the driven ratchet for rotation therewith;
   abutment means for preventing axial movement of said driven ratchet away from said driving ratchet; and
   converter means on the output member and the driving ratchet responsive to said abutment means and said driven ratchet substantially arresting any axial movement of said driving ratchet toward said driven ratchet and continued movement of the output member for converting the axial movement of the output member into an increment of rotational movement of said driving ratchet.

8. In a stepping mechanism, the combination of:
   an output shaft;
   means for mounting said output shaft for rotation;
   a driven cam drivingly connected to said output shaft;
   a driving cam movable along a line;
   electrical means energizable to move said driving cam through one stroke along said line, said cams being responsive to the movement of said driving cam along said line to impart one increment of rotation in one direction to said output shaft and said driven cam; and
   means for automatically imparting a similar increment of rotation to said driving cam in said one direction following the completion of said one increment of rotation of said shaft whereby the driving cam follows said driven cam and said output shaft to recock said cams for a second stroke of said driving cam.

9. A combination as defined in claim 8 wherein said last-mentioned means includes a torsion spring drivingly connected between said output shaft and said driving cam.

10. A combination as defined in claim 8 including a detent wheel drivingly connected to said output shaft and a detent member engageable therewith to limit the rotation of said output shaft and said last-mentioned means includes a scroll spring drivingly connected between said detent wheel and said driving cam.

11. A combination as defined in claim 8 wherein said electrical means includes a first ratchet member and coil means for moving said first ratchet member along said line, said driving cam having a second ratchet thereon engageable with said first ratchet and means are provided for substantially preventing rotation of said first ratchet whereby said driving cam is substantially prevented from rotating when said ratchets are in engagement.

12. In a stepping mechanism of the type which includes a solenoid which is intermittently energizeable to intermittently axially advance an output member and to retract the output member during periods of de-energization, the combination of:
   a driving cam;
   means for mounting said driving cam for generally axial movement;
   interengageable means on said driving cam and the output member engageable in response to the energization of the solenoid and the consequent axial movement of the output member for locking said driving cam against rotation and for pushing said driving cam generally axially, said interengageable means becoming disengaged upon the de-energization of the solenoid and the consequent retraction movement of the output member;
   driven cam means responsive to the axial movement of said driving cam for rotating through one increment;
   an output shaft drivingly connected to said driven cam means for rotation therewith; and
   means for rotating said driving cam when said solenoid is de-energized to recock said driving cam to allow said driving cam to impart a second increment of rotation to said output shaft when the solenoid is again energized.

13. A combination as defined in claim 12 wherein said last-mentioned means includes a torsion spring drivingly connected between said output shaft and said driving cam to recock said driving cam by rotating the latter in the same direction as the rotation of said driven cam means.

14. In a stepping mechanism, for intermittently moving an object, the combination of:
   a rotatable output shaft connectible to the object;
   means for mounting said output shaft for rotation;
   a first ratchet drivingly connectible to said output shaft;
   a second ratchet;
   electrical means energizable to force said second ratchet in one direction into engagement with said first ratchet;
   abutment means for limiting the movement of said second ratchet in said one direction;
   means responsive to movement of said second ratchet in said one direction for imparting an increment of rotation to said output shaft when said ratchets are engaged; and
   means for preventing rotation of said second ratchet in the same direction as the direction of rotation of said output shaft following said increment of rotation of said output shaft, the ratchets being firmly held in engagement by said electrical means and said abutment means to prevent overthrow of the object and said output shaft.

References Cited
UNITED STATES PATENTS

| 2,763,793 | 9/1956 | Krasney | 310—20 |
| 3,136,930 | 6/1964 | Straub | 335—228 |
| 3,156,125 | 11/1964 | Straub | 335—228 X |
| 3,308,410 | 3/1967 | Biser | 335—228 |

WARREN E. RAY, *Primary Examiner.*

U.S. Cl. X.R.

310—23, 80